United States Patent [19]
Schaefer

[11] Patent Number: 5,701,006
[45] Date of Patent: Dec. 23, 1997

[54] METHOD AND APPARATUS FOR MEASURING DISTANCES USING FIBER OPTICS

[75] Inventor: Philip R. Schaefer, Sedona, Ariz.

[73] Assignee: Simula Inc., Phoenix, Ariz.

[21] Appl. No.: 561,590

[22] Filed: Nov. 21, 1995

[51] Int. Cl.$^6$ .................................................. G01J 1/42
[52] U.S. Cl. ........................ 250/227.16; 250/227.14; 356/32
[58] Field of Search .................... 250/227.16, 227.14, 250/227.18; 356/32

[56] References Cited

U.S. PATENT DOCUMENTS

| | | |
|---|---|---|
| 5,094,527 | 3/1992 | Martin ........................................ 356/32 |
| 5,381,493 | 1/1995 | Egalon et al. ............................ 385/13 |

*Primary Examiner*—Edward P. Westin
*Assistant Examiner*—Alan L. Giles
*Attorney, Agent, or Firm*—Crowell & Moring LLP

[57] ABSTRACT

An apparatus and method for measuring distances along single or multiple paths using fiber optics. The system uses a broadband optical source and broadband sensors. The lengths of one or more measurement paths are obtained with respect to the known length of a reference path. In one embodiment of the invention, two oscillators are used, producing signals, e.g., pulse trains, at slightly different frequencies (F1 and F2). The pulse train at F1 propagates through the fiber optic paths, and then is multiplied by the signal at F2, producing a time-expanded version of the original pulse at a frequency |F1–F2|. In a second embodiment, the phase shift of the light signals is measured at multiple frequencies, rather than at just a single frequency. When the light signals from the different measurement optical fibers are combined, the resultant net phase shift is a nonlinear function of both the lengths of the measurement optical fibers and the modulation frequency. Thus, if there are P measurement optical fibers, by obtaining the net phase shift at P different frequencies, a system of P simultaneous equations with P unknown is obtained. These equations are solved to determine the time delay in each of the P different optical fibers.

24 Claims, 8 Drawing Sheets

FIG. 6

METHOD AND APPARATUS FOR MEASURING DISTANCES USING FIBER OPTICS

BACKGROUND

1. Field of the Invention

The present invention relates to the measurement of distance and strain using fiber optics, and has particular application to composite materials and to structures which do not allow the use of metallic conductors.

2. Background of the Invention

Measuring strain in all types of materials is an important problem for determining the condition of structures and structural members, or for measuring the position of structures and components for decision making or control in, e.g., flexible robotics applications. One important (but not exclusive) use of this type of strain sensing is with composite materials.

Advanced composite materials are increasingly being used in combat and tactical vehicle systems, launch vehicles, space platforms, composite wings, and other primary and secondary structures in aircraft, automotive and civil engineering applications. Such composite components include helicopter rotors; aircraft fuselage, floor and skin sections; and reinforced columns in highway bridges.

Composite materials are lighter and stronger than the traditional materials, such as steel and aluminum alloys, or concrete, which have been used for these applications in the past. Composites lend themselves readily to embedded instrumentation for monitoring the condition of the component. However, the relative novelty of composite technology and the fact that composites are brittle and fail catastrophically have led to the over-design of composite components, consequently reducing their potential advantage. Composite materials must also demonstrate that they retain their strength and other properties over long periods of time.

Electro-resistive strain gauges have long been used to measure strain. However, they are limited by their susceptibility to corrosion, by their limitation to providing "point" measurements only, by being susceptible to electromagnetic interference, and by the requirement that many wires must be used with each strain gauge site. Hundreds or even thousands of conventional strain gauges would be required to monitor large structures.

Fiber optic sensors have been developed to overcome some of the limitations of wired strain gauges. As described in "Fiber Optic Sensors: Rx for the Infrastructure," Photonics Spectra, pp. 80–88 (March, 1995), optical fibers offer many advantages over electrical and mechanical strain sensors. Optical fibers are lightweight, insensitive to electromagnetic interference, are resistant to corrosion, can be exposed to a wide operating temperature range, possess low signal attenuation and high bandwidth characteristics for device multiplexing, and are small in size. Fiber optic strain sensors can be used in any application in which the strain of a mechanical member must be measured, whether to assess the condition of the member, or to control the position of the member. For example, fiber optic sensors can be embedded into, or attached to the outside of large composite components to measure deformations or deflections of the material, especially, e.g., when metallic conductors (which are required for electro-resistive strain gauges) are undesirable.

However, the cost and number of current-technology fiber optic sensors is too high for monitoring large components. A bridge, for example, would require sensing along its entire length, i.e., it would require hundreds of fiber optic sensors. Most fiber optic methods in practice today for measuring strain in this way are much too expensive to be widely used to monitor the condition of composite structures.

Bragg sensors, which are described in "Today's Sensors for Tomorrow's Structures," Photonics Spectra, pp. 88–92 (April, 1994), are currently used for strain measurements. However, Bragg sensors require either a frequency-controlled narrow band light source or a detector capable of measuring light over narrow frequency bands. Also, Bragg sensors can only sense strain at a single point, and not along the entire length of a path.

U.S. Pat. No. 4,671,659 to Rempt, U.S. Pat. No. 5,218,197 to Carroll and U.S. Pat. No. 5,381,492 to Dooley disclose fiber optic sensors using interferometers. Interference patterns produced by interference between a reference beam and a measurement beam are used to detect changes in the length of an optical fiber embedded in or attached to a structure. U.S. Pat. No. 4,654,520 to Griffiths discloses an optical fiber sensor attached to a structure. A light signal is input to an optical fiber, and changes in the light transmitted through the fiber, or reflected back out of the input end of the fiber, are monitored to detect physical movements of the structure. However, the detectors for measuring interference patterns are expensive because they must measure a pattern of light across a surface, rather than just a single light intensity.

U.S. Pat. No. 4,725,728 to Brininstool and U.S. Pat. No. 4,132,991 to Wocher disclose pulse techniques for measuring distances. Brininstool discloses an optical fiber time delay resonant strain gauge in which the measurement optical fiber is coupled to optical injection and extraction couplers to form an optically recirculating loop. A laser diode feeds a series of narrow pulses into the recirculating loop. The frequency of the pulses is adjusted until the frequency of the pulses matches the recirculating frequency of the loop. The period of the pulses is then equal to the time it takes for one pulse to circulate through the optical loop, i.e., it can be used to measure the length of the optical fiber. Wocher discloses a non-optical fiber technique using radar pulses. A radar source is aimed at a target. Echo pulses reflected back by the target are expanded in time by multiplication in an electronic signal processor with an auxiliary pulse sequence differing slightly in repetition rate from the radar pulse sequence. This enables the use of lower time resolution and therefore lower cost components than would otherwise be needed.

DEFINITIONS

"Time-expansion multiplier," as used herein, shall mean an electronic device which convolves two signals, a first input signal (which is to be expanded in time), and a second shaper signal (which determines the frequency and the shape of the time-expanded output signal). The output signal is the convolution of the first input signal and the second shaper signal, such that the first input signal is expanded in time by a factor related to the difference in the fundamental frequency of the first and second signals.

SUMMARY OF THE INVENTION

The present invention is a method and apparatus for measuring strain in structural members using fiber optics. As a structural member is subjected to applied stresses, the length of the member under stress changes. The difference in the length of the member under stress, i.e., the strain in the member, is measured by embedding one or more measuring optical fibers in the structural member, or attaching the measuring optical fibers to the member, such that the lengths of the measuring optical fibers change as the length of the structural member changes. A reference optical fiber is mounted such that its length does not change as the length of the structural member under stress changes.

Figure 1A:
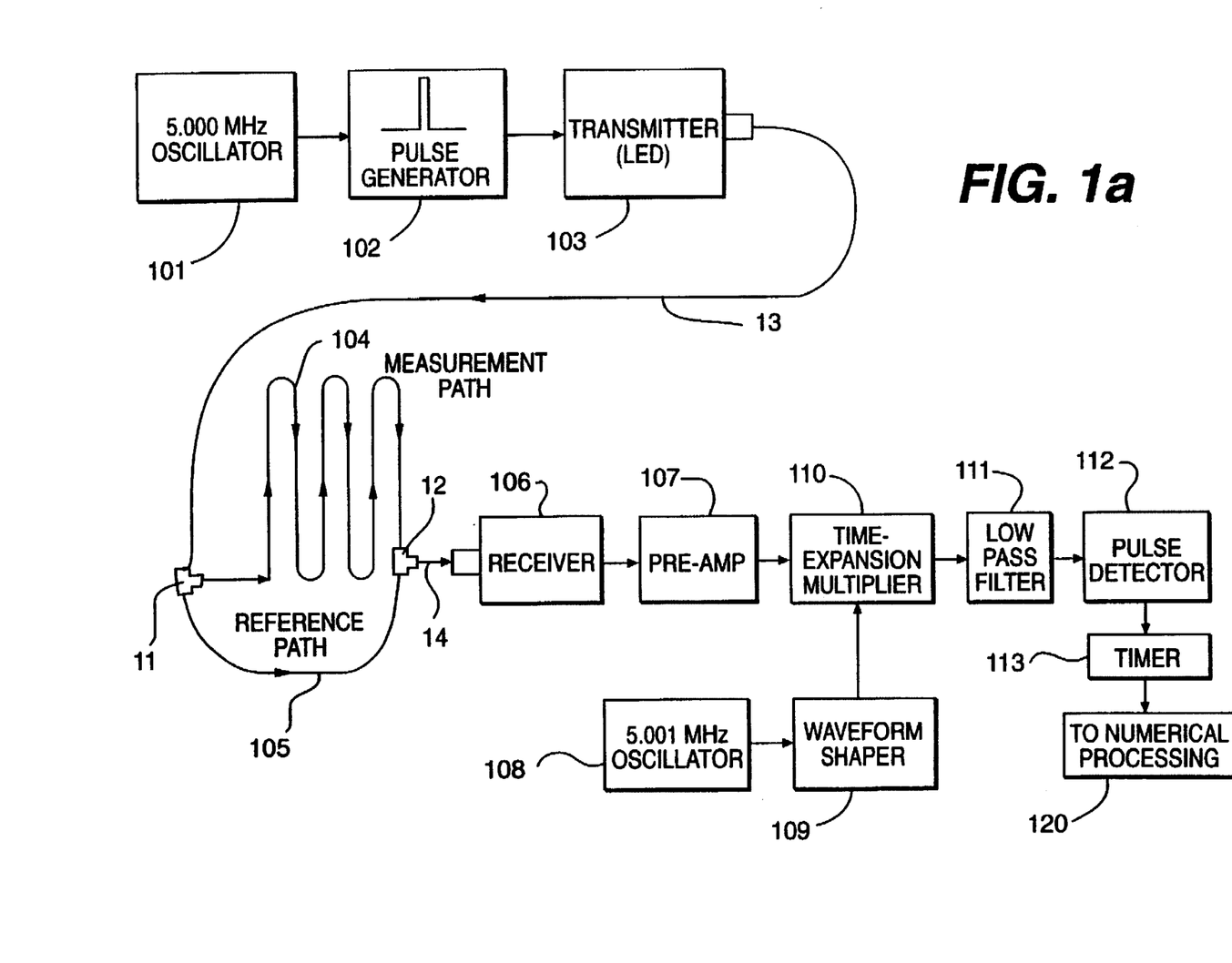
FIG. 1a is a schematic block diagram of the first preferred embodiment of the present invention.

The first preferred embodiment of the present invention is shown schematically in FIG. 1a. Light signals, e.g., light pulses, generated by a light source such as a light emitting diode (LED) are fed into an input beam splitter, split by the input beam splitter, and input to measurement optical fibers and a reference optical fiber. The respective lengths of the reference and measurement optical fibers are selected such that the difference in the time it takes for the light pulses to travel through any two optical fiber paths is greater than the duration of the light pulses. The light pulses are re-combined by an output beam splitter (which operates as a beam combiner). A detector mounted at the output of the beam combiner detects at least two pulses for each pulse input to the input end—one reference pulse and one or more measurement pulses (one additional pulse is needed for each additional measurement fiber).

Another sampling pulse of slightly different frequency is multiplied in an analog multiplier with the detected pulse to create a time-expanded version of the original pulse. During each sampling pulse, the multiplier captures a short segment of the detected (reference and measurement) pulse for the duration of the sampling pulse. Since the two pulses shift in time with respect to each other, the multiplication captures a slightly different part of the detected pulse during each successive cycle. After enough "samples" are taken, i.e., after a period equal to the reciprocal of the difference in frequency between the frequencies of the two pulses, the original pulse is replicated in shape, but is expanded in time. The frequency of the time-expanded pulse is equal to the difference in the frequencies of the two pulses, i.e., its frequency can be one, two or three or more orders of magnitude lower than the frequency of the original pulse.

The lower-frequency pulse is much easier to process than the original high-frequency pulse, and therefore requires less expensive components. For example, if the lower-frequency pulse is at an audio frequency (e.g., between 200 Hz and 20,000 Hz), inexpensive analog components are readily available for the signal processing circuitry. Because the lower-frequency pulse replicates the shape of the original pulse, it can be used to accurately determine the time difference between the reference pulse and the measuring pulses.

Figure 1B:
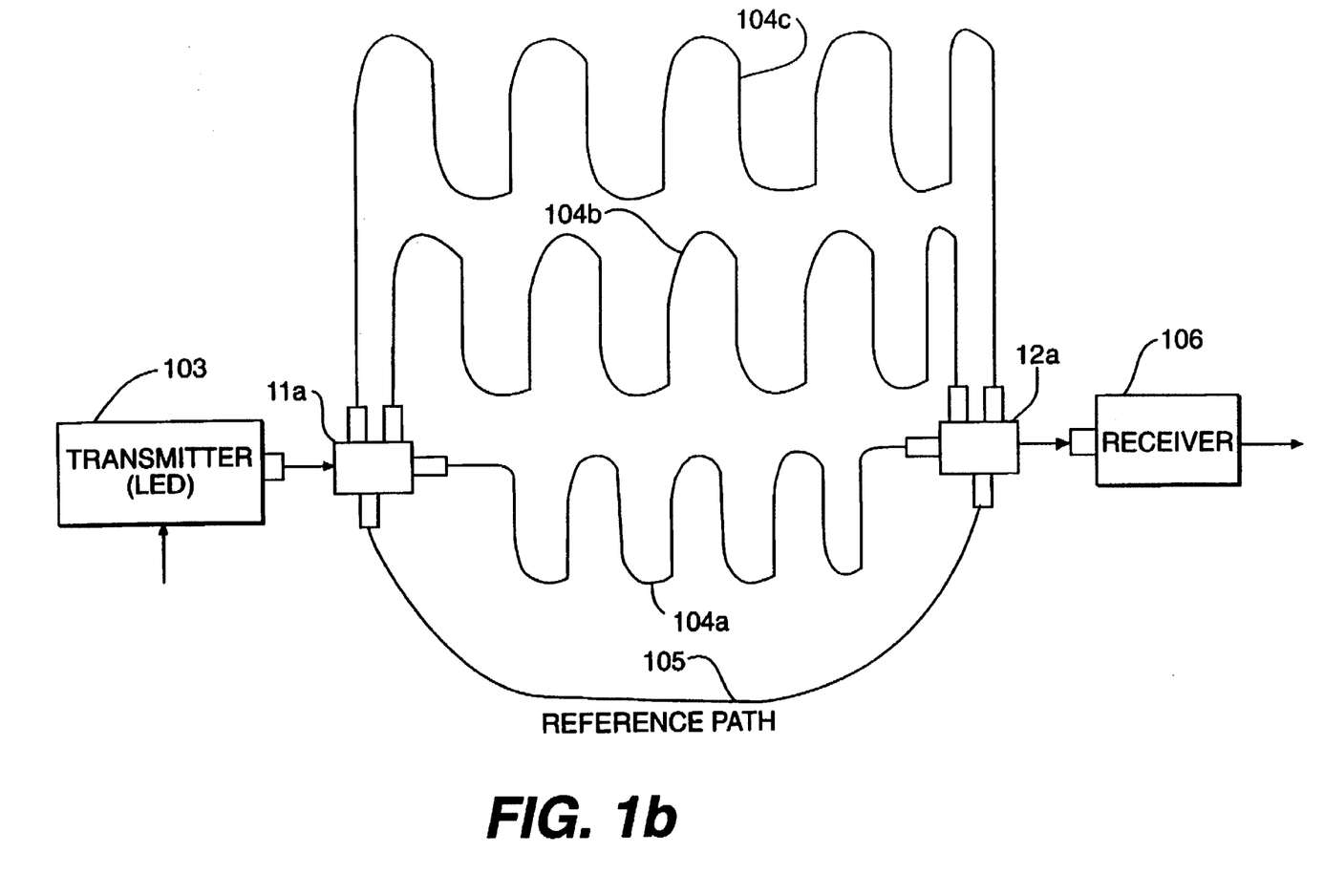
FIG. 1b is a schematic diagram of the portion of the optical circuit of the first embodiment, as it is used with multiple measurement optical fibers.

FIG. 1b is a schematic diagram of a portion of the optical circuit, showing how the optical signal, e.g., a pulse, is split into N+1 pulses (for the case of N=3), one pulse for the reference optical fiber, and one pulse for each of the N measurement optical fibers. The length of each of the N optical fibers must be selected such that it is different from the length of all the other optical fibers, such that each pulse can be identified with a particular measurement fiber, based upon the known approximate time delay for that fiber. Moreover, the length of the measurement optical fibers cannot be such that the pulses from, e.g., the $j^{th}$ sequence overlap with the pulses from the $(j+1)^{th}$ sequence.

The distance the light signals travel through the reference fiber remains constant (because the reference optical fiber's length does not change as the structure is deformed). The distance the light signals travel through the measurement fiber(s) changes as the length of the structure changes, because the measurement optical fibers are embedded into or attached to the structure such that their lengths change as the length of the structure changes. Accordingly, the time difference between the reference and measurement signals can be used to measure changes in the length of the structure as it is deformed by applied stresses.

In a second preferred embodiment of the present invention, the change in length of the measurement optical fibers is obtained using a phase-shift measurement. The phase shift of the amplitude modulation of the light is measured at multiple frequencies, rather than at just a single frequency. At any one modulation frequency, there is a different phase shift in each one of the measurement optical fibers. Furthermore, when the light signals from the measurement optical fibers are combined, the resultant net phase shift is a nonlinear function of both the lengths of the measurement optical fibers and the modulation frequency. Thus, if there are P measurement optical fibers, by obtaining the net phase shift at P different frequencies, a system of P simultaneous equations with P unknowns (the optical path lengths of the P measurement optical fibers) is obtained. These equations are solved to determine the time delay in each of P different measurement paths.

Accordingly, the present invention uses relatively simple and inexpensive components, i.e., a broadband light emitter such as an LED, a simple light intensity detector (that does not have to detect the intensity at each frequency), and standard optical components such as optical fibers and beamsplitters or combiners. The present invention can be multiplexed, such that a single detector system can be used for multiple fibers. Also, because the measurement of the lengths of the optical fibers are made relative to the length of the reference optical fiber, any thermal or other drifts in the electronic circuitry are automatically compensated for. Furthermore, length is measured over entire lengths of optical fiber paths, so that strain is integrated over the sensor length, rather than measured at discrete points.

It is an object of the present invention to reduce the cost of measuring distances using optical fibers.

It is another object of the present invention to make multiple measurements using a single detector system.

It is a further object of the present invention to measure distances using signals that can be processed at audio frequencies.

It is a further object of the invention to use inexpensive wideband components such as LEDs for the light source and photodiodes for the detectors in a fiber optic sensor.

It is a further object of the invention to provide a sensor that is unaffected by drift in the signal processing electronics.

These and other objects of the present invention are described in greater detail in the detailed description of the invention, the appended drawings and the attached claims.

DESCRIPTION OF THE DRAWINGS

FIG. 2 is a signal diagram which illustrates the operation of the preferred embodiment of FIG. 1a.

FIG. 3a is a signal diagram which illustrates the operation of the time-expansion multiplier in the preferred embodiment of FIG. 1a.

DETAILED DESCRIPTION OF PREFERRED EMBODIMENTS OF THE INVENTION

The present invention uses time-expansion or phase shift techniques to measure time delays in optical signals transmitted through optical fibers embedded in or attached to structural members.

The First Preferred Embodiment: Time-Expansion

The first preferred embodiment of the present invention is shown schematically in FIG. 1a. For clarity, FIG. 1a shows only one measurement fiber. However, the present invention could be used with multiple measurement fibers, as explained below.

In the first preferred embodiment, an oscillator 101 at, e.g., 5.000 MHz, and a pulse generator 102 combine to produce a series of narrow, e.g., 25 nanosecond, pulses at the 5.000 MHz repetition rate. Optical transmitter 103, e.g., an LED, converts the electrical pulses to optical pulses at the same repetition rate and pulse width, e.g., 25 nanosecond pulses at 5.000 MHz. The optical pulses are coupled into optical fiber 13. Beam splitter 11 splits the optical beam into a measurement optical fiber 104 and a reference optical fiber 105.

Measurement optical fiber 104 is attached or embedded in a structural member such that its length changes as the length of the structural member changes. Reference optical fiber 105 is mounted so that its length is unaffected by the changes in the length of the structural member. The optical signals, pulses in the example shown in FIG. 1a, from measurement optical fiber 104 and reference optical fiber 105 are combined by beam splitter 12, and input via optical fiber 14 to receiver 106. The pulse is then processed, as described below, by pre-amp 107, time-expansion multiplier 110, low-pass filter 111 and pulse detector 112. Time-expansion multiplier 110 also receives input from oscillator 108, operating at 5.001 MHz and waveform shaper 109. Timer 113 measures the time difference between the peaks of the pulses, taking into account the time-expansion introduced by time-expansion multiplier 110.

The processed signal replicates the waveform of the optical signal, but is expanded in time. The frequency of the processed signal is the difference in frequency between the signals produced by oscillator 108 and oscillator 101, i.e., if oscillator 108 is set at 5.001 MHz and oscillator 101 is set at 5.000 MHz, the processed signal will be at 1.0 KHz. Because 1.0 KHz is an audio frequency, filter 111, pulse detector 112 and timer 113 can be constructed using relatively inexpensive, readily-available components.

Each of the components used in the first preferred embodiment will now be described in greater detail, as follows.

101: 5.000 MHz Oscillator

Oscillator 101 generates a 50% duty cycle signal. The 5.000 MHz frequency was selected because it is stable (in general, higher frequency signal generators are more stable than lower frequency generators because the fast edge rates make them less sensitive to noise) but not too fast for the electronics to handle (higher frequencies are more expensive because they require special signal processing components). The present invention can be used at frequencies ranging from about 100 KHz to about 1,000 MHz, with a preferred frequency range from about 5.0 MHz to about 50 MHz 102: Pulse Generator Pulse generator 102 reduces the 50% duty cycle of the 5.000 MHz signal from oscillator 101, to 12.5% (for example), resulting in approximately 25 nanosecond wide pulses that occur at a 5.000 MHz rate. The width of the pulses must be selected such that separate and non-overlapping pulses are detected at receiver 106.

103: Transmitter

Transmitter 103 converts the electrical pulses received from pulse generator 102 into optical pulses. Typically, transmitter 103 is a Light Emitting Diode (LED). The 25 nanosecond wide, 5.000 MHz optical pulses generated by the LED are coupled into optical fiber 13.

104, 105: Measurement and Reference Paths

The optical pulses produced by transmitter 103 are transmitted in optical fiber 13 to optical beam splitter 11. At beam splitter 11, the pulses are each split into two, and are directed into the reference and measurement optical fibers. (For an implementation with N measurement paths, a 1×N+1 splitter would be used, the pulses would each be split into N+1 pulses, directed into the reference optical fiber and the N measurement optical fibers 104a, 104b, 104c, as shown in FIG. 1b.) Reference optical fiber 105 is preferably selected to be shorter than measurement optical fiber 104 (or multiple measurement optical fibers 104a, 104b, etc.), such that the difference in the time that it takes for the light to propagate through the fibers is sufficient such that the pulses do not overlap in receiver 106.

Measurement optical fibers 104 or 104a, 104b, 104c, etc. are embedded within, or attached to, the structural member such that the deformation causes the length of the measurement optical fibers to change. This causes the time that it takes for the light to propagate through the fiber to change along with the amount of deformation. Reference optical fiber 105 is mounted such that it undergoes no change in length, i.e., such that the time it takes for the light to propagate through the reference optical fiber remains constant.

Figure 2:
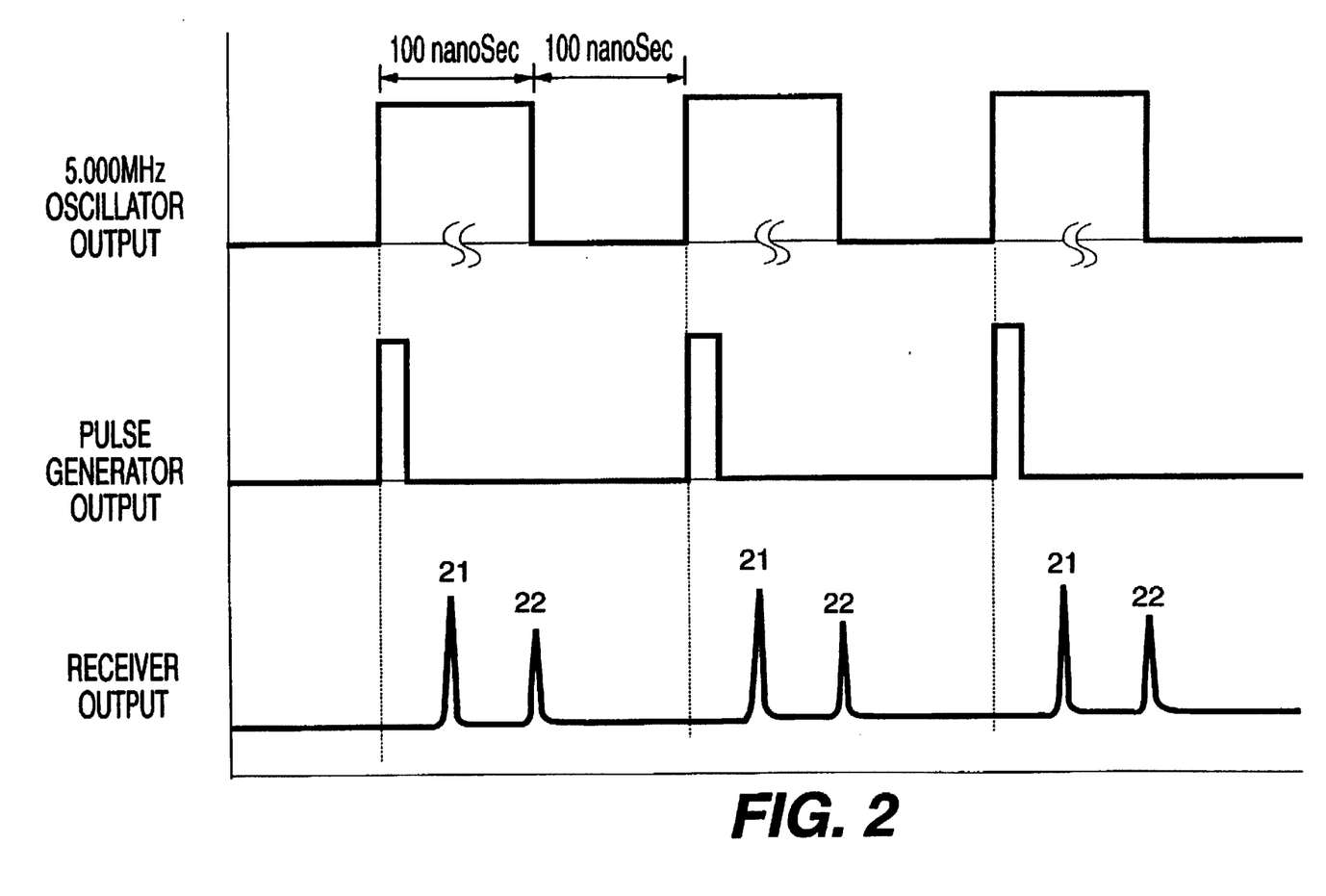

The output of the reference and measurement optical fibers is combined by beam splitter 12. Beam splitter 12 (which is physically identical to beam splitter 11, but is mounted in the reverse direction relative to the propagation direction of the optical pulse, so that it combines the optical pulses instead of splitting them) outputs the combined optical pulses to receiver 106. The output of beam splitter 12 is a light beam that has two distinct pulses for every pulse inserted at the input end, as shown in FIG. 2. (For an implementation with N different measurement optical fibers, N+1 pulses would be present.)

The time between the pulses is a measure of the difference in length between the measurement and reference optical paths. To measure this time difference directly and get millimeter or better spatial resolution, which translates to as little as several picoseconds in time difference, would require very expensive components. This problem is overcome in the first embodiment of the present invention by the use of time-expansion multiplier 110.

106: Receiver

Receiver 106 converts the combined output of the measurement and reference fibers into electrical signals. FIG. 2 illustrates how the 50% duty-cycle 5.000 MHz square wave produced by oscillator 101 is used to produce 25 nanosecond wide pulses at the output of pulse generator 102. FIG. 2 shows the waveform of the combined reference 21 and measurement 22 pulses at receiver 106. Measurement pulses 22 in FIG. 2 are somewhat smaller than reference pulses 21, due to its longer path length or due to other strain-induced effects, e.g., misalignment of optical elements.

107: Pre-Amplifier

Pre-amplifier 107 amplifies the output signal received from receiver 106, and amplifies it to a signal level that can be more easily manipulated. It compensates for losses in the intensity of the signal that occur in the transmitter, optical splitters, and receiver sections. (Converting the electrical signal to light and back again is not very efficient. Some signal strength is also lost getting the light from the LED channeled into the fiber, and more is lost getting the signal out of the fiber.)

108: 5.001 MHz Oscillator

Oscillator 108 is similar to 5.000 MHz oscillator 101, but it is set at 5.001 MHz. The key is that the difference in frequency between oscillator 101 and oscillator 108 is very small, 1 KHz in this example. The signal from oscillator 108 is used in time-expansion multiplier 110 to expand in time the signal received from the receiver 106.

109: Wave Form Shaper

This circuit modifies the form of the signal received from oscillator 108. For example, although ideal impulse function pulses output by waveform shaper 109 can be mixed with the receiver signal to obtain a time-expanded pulse at time-expansion multiplier 110, rounded pulses from waveform shaper 109 can be used to produce a smoother output from time-expansion multiplier 110. Other waveforms from waveform shaper 109 will produce distinctive transformations of the 5.000 MHz pulse trains for various applications.

110: Time-Expansion Multiplier

Figure 3A:
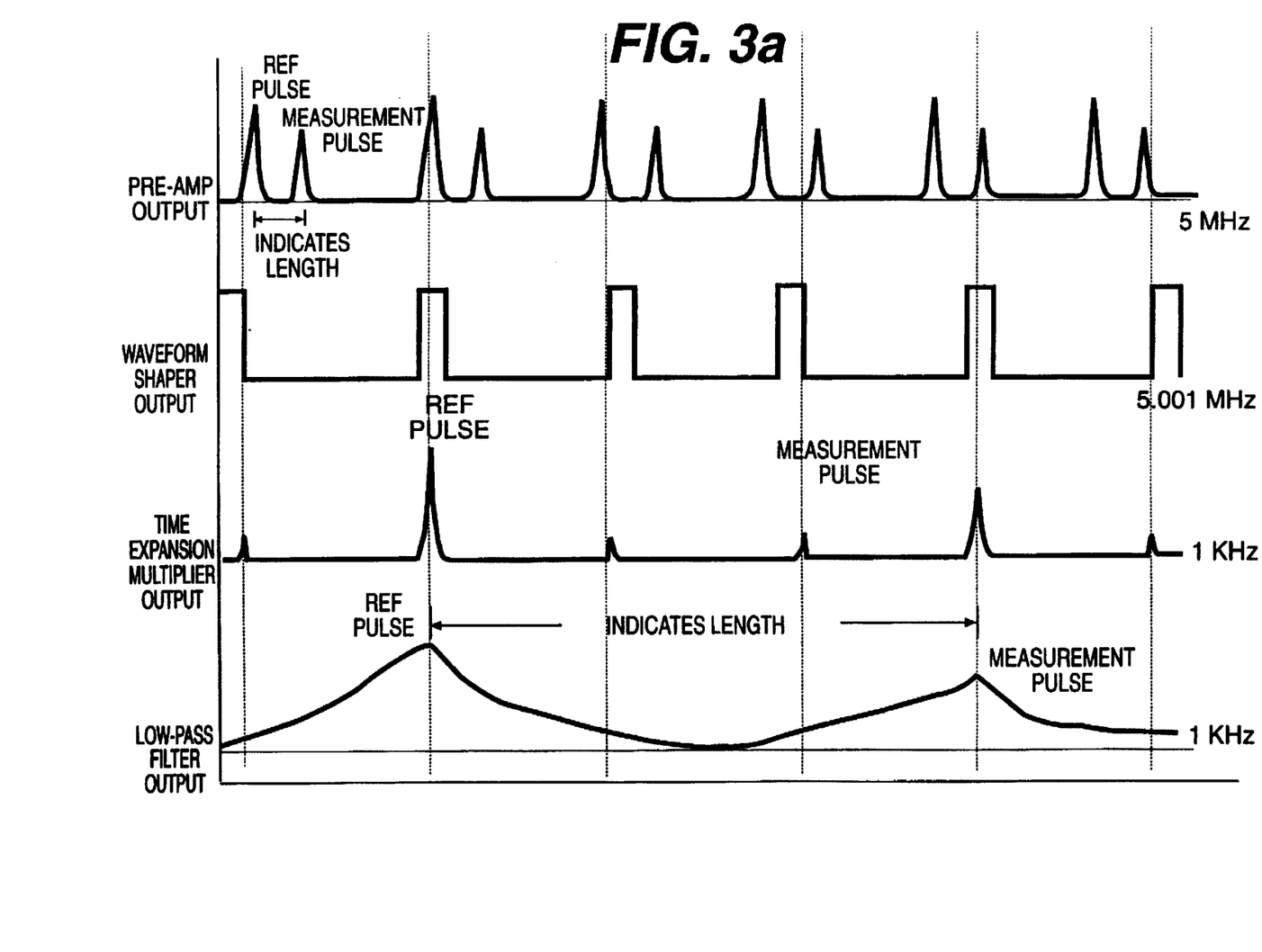

As illustrated in FIG. 3, if the input to time-expansion multiplier 110 from waveform shaper 109 is a series of short impulse function pulses, the output of time-expansion multiplier 110 is a pulse train which replicates the pulse output by pre-amplifier 107, but at a frequency equal to the difference between the frequency of the pre-amp output signal and the frequency of the waveform shaper signal. For example, if the frequency of the pulse input to time-expansion multiplier 110 by pre-amp 107 is 5.000 MHz, and the frequency of the short pulses input by waveform shaper 109 is 5.001 MHz, the output of time-expansion multiplier 110 will include a 1 KHz frequency pulse, whose shape replicates the original shape of the 5.000 MHz pulse from pre-amp 107. If the waveform shaper 109 is producing rounded pulses, the output of the time-expansion multiplier is a smoothed version of the original pulse. Each cycle of the output of time-expansion multiplier 110 can be described mathematically as the convolution of the waveform from pre-amplifier 107 and the waveform from pulse shaper 109.

Analog multipliers similar to mixers used for communications applications could be used for time-expansion multiplier 110. However, there are two important differences between a typical mixer and the multiplier used for time-expansion:

(1) A mixer is typically used to change the frequency of a modulated signal to another carrier frequency, or to extract the modulation from a modulated signal. The time-expansion multiplier used in the present invention expands the entire waveform, not just the carrier frequency component.

(2) A mixer may have narrow-band "tuned" inputs, because the information contained in the signals input to typical mixers is found in a relatively narrow band near the carrier frequency. The time-expansion multiplier must be broadband, because the pulse train contains information many octaves beyond the base pulse-repetition frequency, e.g., 5.00 MHz.

111: Low Pass Filter

Low-pass filter 111 eliminates the remaining high-frequency components in the pulse produced by time-expansion multiplier 110, outputting only the time-expanded pulse shown in the bottom plot in FIG. 3.

112: Pulse Detector

Figure 3B:
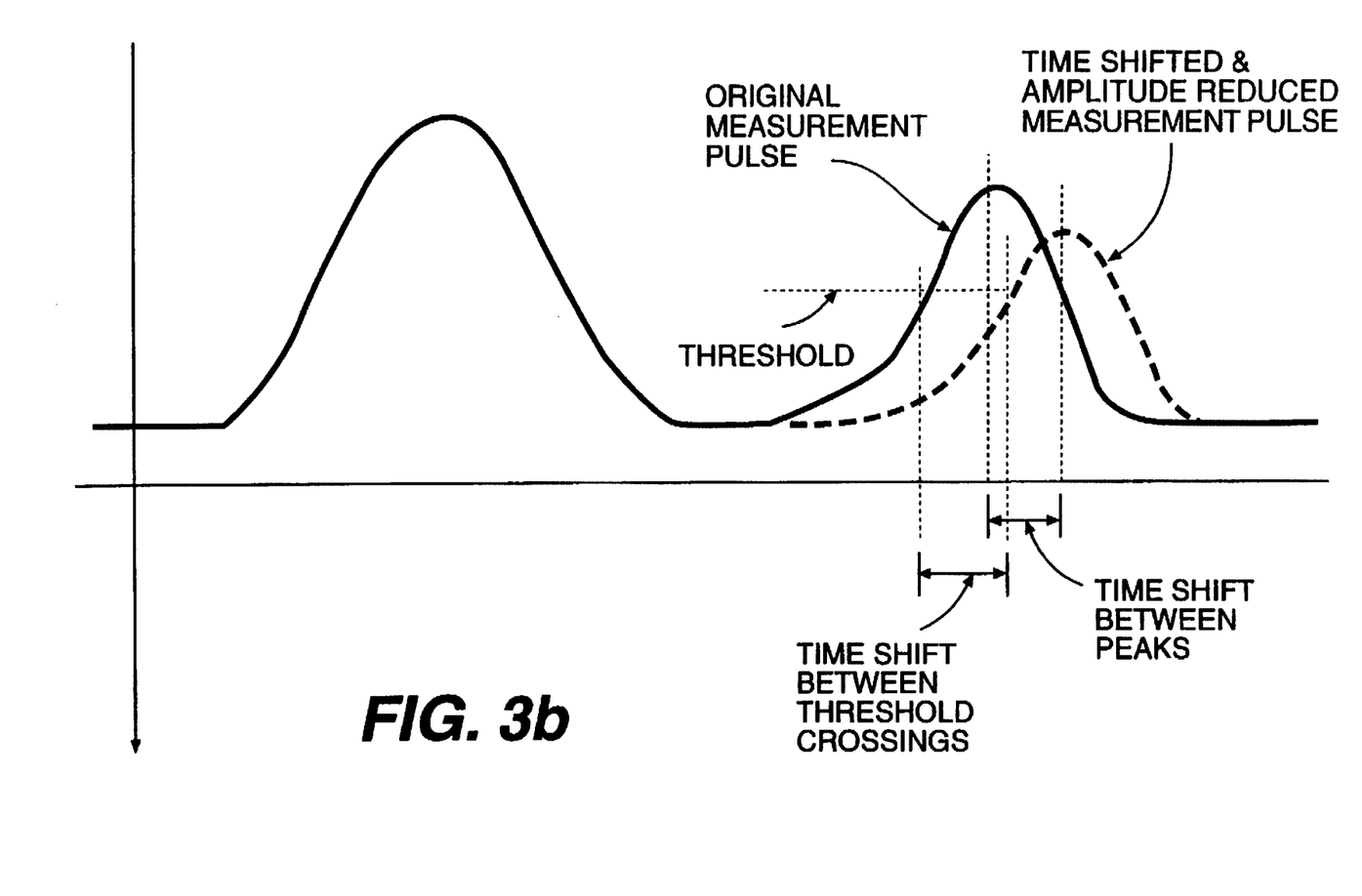
FIG. 3b is a signal diagram which illustrates the operation of a threshold detector.

Pulse detector 112 determines the arrival time of each pulse in the time-expanded pulse, by locating the peak of each pulse. It produces a digital pulse with vertical edges which indicate the arrival time of each pulse. Alternatively, pulse detector 112 can be implemented as a threshold detector, which outputs a vertical edge whenever a pulse input to the threshold detector reaches a pre-defined percentage of the maximum amplitude of the reference pulse. This effectively increases the sensitivity of the fiber optic sensor, because the threshold detector will respond to changes in the measurement optical fiber which reduce the intensity of the measurement pulse, in addition to changes which delay the arrival of the measurement pulse, as shown in FIG. 3b. For example, if the measurement optical fiber's diameter is reduced by the elongation of the optical fiber, the amplitude of the measurement pulses is reduced. This lower amplitude measurement pulse causes the threshold detector to fire later in time, resulting in an amplification of the pulse detector's time shift, thus increasing the fiber optic sensor's overall sensitivity to changes in strain. The threshold-detector method should not be used if the measurement pulse could undergo changes in amplitude not due to strain, e.g., due to a bending of the fiber, because false readings may result.

113: Timer

Timer 113 clocks the time interval between the peaks of the pulses detected by the pulse detector 112.

120: Numerical Processor

Numerical processor 120 then computes the difference in distance between the reference and measurement optical fibers from the time interval between the reference pulse and the measurement pulse, divided by the time-expansion factor introduced by time-expansion multiplier 110. This processing could be performed by a low-cost microprocessor or by an external computer.

The Second Preferred Embodiment: Phase Shift Measurements

Figure 4:
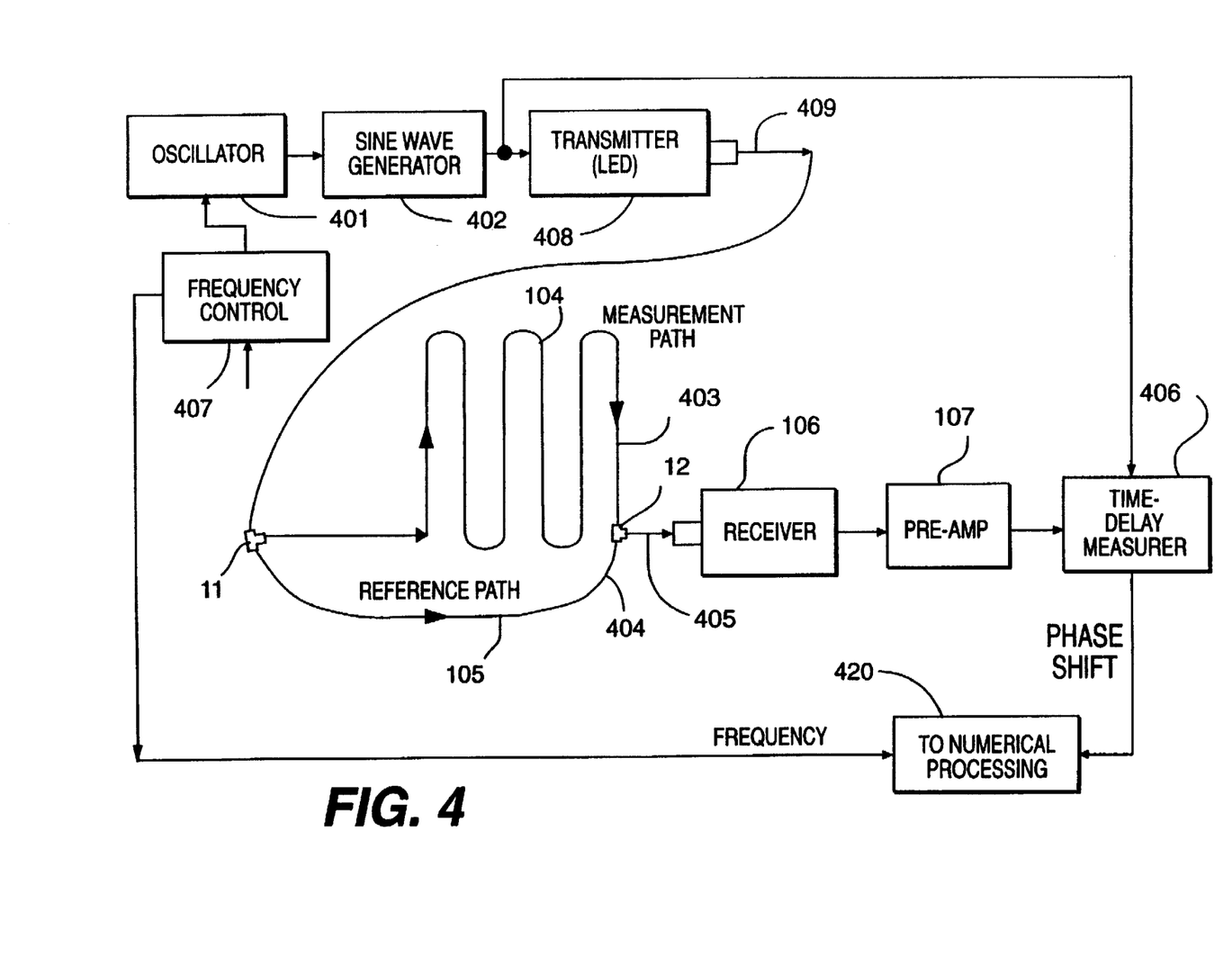
FIG. 4 is a schematic block diagram of the second preferred embodiment of the present invention.
Figure 5:
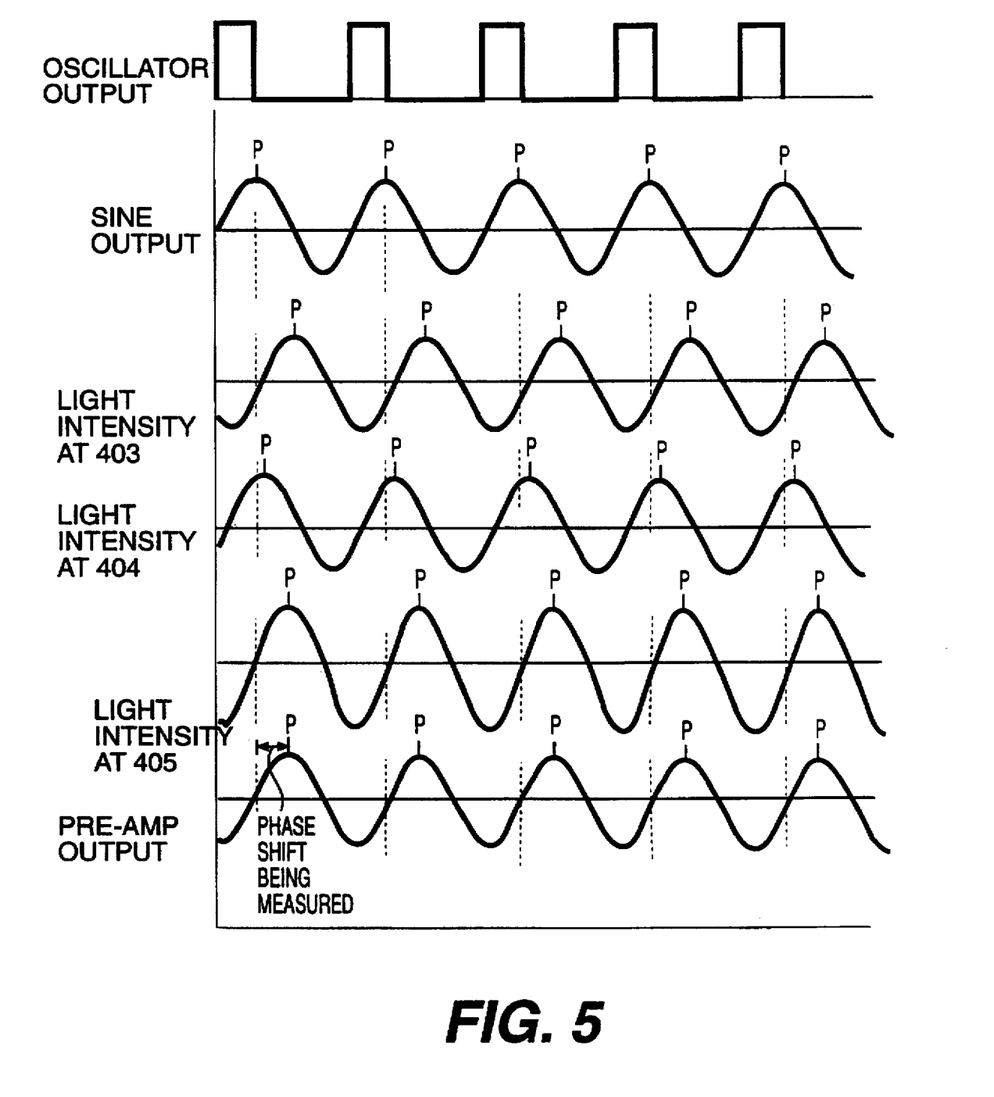
FIG. 5 is a signal diagram which illustrates the operation of the second preferred embodiment of FIG. 4.

The second preferred embodiment of the present invention is shown schematically in FIGS. 4 and 5. It is a multiple-path system which produces signals of multiple frequencies and measures the phase shift at each frequency. The phase shifts are then used to calculate the distance the optical pulses have traveled through the various measurement optical fibers. For clarity, FIGS. 4 and 5 only show the system with one measurement optical fiber. However, it can be implemented using multiple optical fibers, using an optical circuit similar to the circuit shown in FIG. 1b. The following is a detailed description of the functional blocks of this embodiment.

401: Oscillator

Oscillator 401 can have its frequency set to one of a series of frequencies, e.g., from 10.0 MHz to 50.0 MHz, in steps of 5 MHz. The frequency of the oscillator is specified by the value of the input to frequency control 407, shown in FIG. 4.

402: Sine Wave Generator

Sine wave generator 402 produces a sinusoidal waveform, at the frequency generated by oscillator 401.

407: Frequency Control

Frequency control 407 enables the system to operate at a series of distinct frequencies $\omega_i$, in order to permit the multiplexing of multiple optical fibers, and thus the measurement of multiple distances simultaneously. The frequency control varies the frequency of oscillator 401. Frequency control 407 also provides the numerical processor 420 with the current modulation frequency.

408: Transmitter

Transmitter 408, e.g., an LED, converts the electrical signal from sine wave generator 402 into an optical signal. The light generated by the LED is then routed into an optical fiber.

The output of transmitter 408 is a light signal whose intensity varies sinusoidally with time at the frequency of set by sine wave generator 402. The intensity of the light (I) at the output of transmitter 409 thus can be given by:

$$I_{409} = A + A \cos(\omega_i t)$$

where $\omega_i$ is the $i^{th}$ angular frequency (controlled by frequency control 407) of the signal input to the transmitter, and 2A is the maximum intensity of the light. The beam emitted by transmitter 408 is coupled into optical fiber 409. The beam is split by beam splitter 11 into a measurement optical fiber 104 and a reference optical fiber 105, and then recombined at beam splitter 12 into optical fiber 405.

403: Light Out of Measurement Optical Fiber

The light exiting measurement optical fiber 104 at exit 403 will be a time-delayed version of the light emitted by transmitter 408. The time delay of the light at exit 403 is a function of the strain in the structural member in which measurement optical fiber 104 is embedded (or to which it is attached). If the delay through the $j^{th}$ measurement optical fiber is $\tau_j$, and $2a_j$ is the maximum intensity of the light at exit 403, then the intensity of the light exiting measurement optical fiber 104 at exit 403 is given by:

$$I_{403} = \alpha_j + \alpha_j \cos \omega_i(t - \tau_j)$$

404: Light Out of Reference Path

The light exiting reference optical fiber 105 at exit 404 is a time-delayed version of the light emitted by transmitter 408. The time delay will be constant, and is proportional to the length of the reference path. If the time delay through the reference optical fiber is $\tau_0$, and $2a_0$ is the maximum intensity of the light at exit 404, then the intensity of the light output by reference optical fiber at exit 404 is given by:

$$I_{404} = \alpha_0 + \alpha_0 \cos \omega_i(t - \tau_0).$$

405: Recombined Light Out of Both/All Paths (Receiver Input)

At the input 405 of receiver 106, the intensity of the light is the sum of the intensity of the light from the measurement optical fiber(s) 104, 104a, 104b, etc., and the intensity of the light from reference optical fiber 105. Because the light signals output by the different optical fibers are sinusoidally varying at the same frequency (albeit with different time delays), the re-combined light intensity will also be sinusoidally varying. If P is the number of measurement paths, then the combined light signal intensity is given by:

$$I_{405} = \sum_{j=0}^{P} a_j \cos \omega_i(t - \tau_{i,app})$$

which can be expressed as:

$$b_i \cos \omega_i(t - \tau_{i,app})$$

where $\tau_{i,app}$ is the net, apparent time shift of the sum of the individual paths, and $b_i$ is the observed net intensity.

406: Time-Delay Measurer

The time-delay measurement module 406 measures the relative phase shift between the sine wave input to transmitter 408 and the sine wave output by receiver 106. This phase shift could be measured using the heterodyne phase-measurement technique described in U.S. Pat. No. 4,639,129 to Hullein and Fribault, which is expressly incorporated herein by reference. The output of time-delay module 406 is a digital value indicating the time delay calculated from the phase shift between the two sinusoidal signals, which is the observed value $\tau_{i,app}$.

420: Numerical Processor

Numerical processor 420, e.g., a personal computer, calculates the lengths of the optical fibers given the net time shifts at each of the measurement frequencies. As given above, the net time shift at frequency $\omega_i$ is $\tau_{i,app}$. $\tau_{i,app}$ is related to the time shifts of the individual fiber optic paths by:

$$b_i \cos \omega_i(t - \tau_{i,app}) = \sum_{j=0}^{P} a_j \cos(\omega_i t - \omega_i \tau_j).$$

which can be expanded into:

$$b_i[\cos(\omega_i t)\cos(\omega_i \tau_{i,app}) + \sin(\omega_i t)\sin(\omega_i \tau_{i,app})] =$$

$$\sum_{j=0}^{P} a_j[\cos(\omega_i t)\cos(\omega_i \tau_j) + \sin(\omega_i t)\sin(\omega_i \tau_j)].$$

For each j, i.e., for each measurement optical fiber, equations matching the sine and cosine coefficients can be derived. If the phase shift measurement is made at P frequencies $\omega_i$, to produce P equations with P unknowns, then the P time delays $\tau_j$'s can be computed. The resultant strains are determined from the time delays and from the known speed of light.

Alternative Optical Circuit

Figure 6:
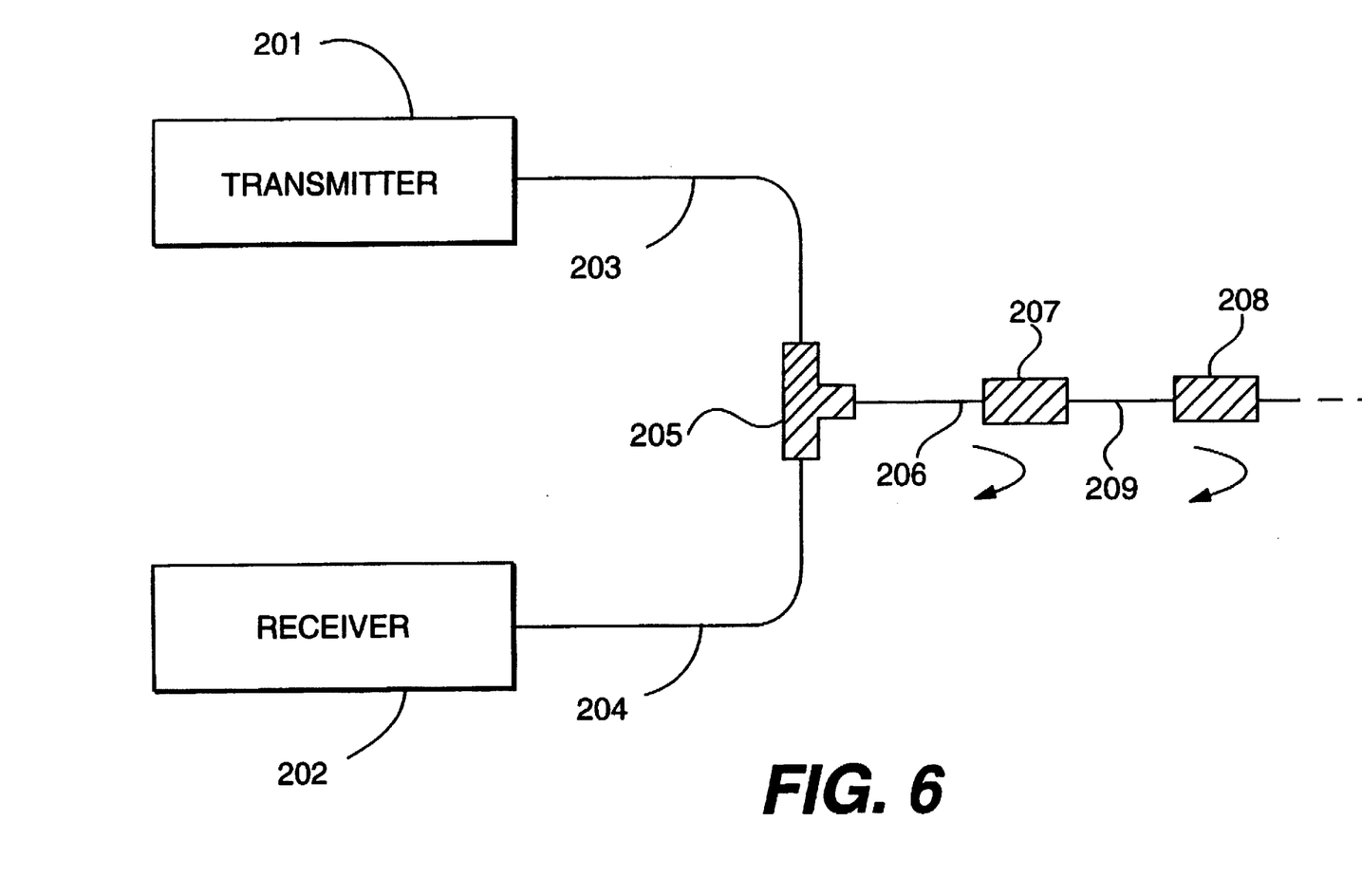
FIG. 6 as a schematic diagram of an alternative optical circuit for the present invention, which uses partial reflectors.

FIG. 6 is a schematic diagram of the optical circuit used with an alternative embodiment of the present invention. The optical circuit of FIG. 6 can be used with the optical signal generators and receivers of either the first or the second embodiments. Transmitter 201 represents either a source of light pulses for the first embodiment) or sinusoidal waves (for the second embodiment). Connecting fiber 203 optically connects transmitter 201 to an optical beam splitter 205. Light signals transmitted along optical fiber 203 are directed into reference fiber 206 by beam splitter 207. The light signals are partially reflected at a first partial reflector 207, and travel back through optical fiber 206, beam splitter 205, and optical fiber 204 to receiver 202. Receiver 202 represents either the receiving system of FIG. 1 (for the first embodiment) or the receiving system of FIG. 4 (for the second embodiment).

Reference fiber 206 is installed such that its length does not change as the length of the structure changes. Thus the time it takes for signals reflected at partial reflector 207 to reach receiver 202 remains constant.

The light signals which are transmitted by partial reflector 207 travel along measurement optical fiber 209 to a second partial reflector 208. Measurement optical fiber 209 is attached or embedded in the structure such that its length changes as the length of the structure changes. The light signals partially reflected at partial reflector 208 travel back through measurement optical fiber 209, partial reflector 207, reference fiber 206, beam splitter 205 and connecting optical fiber 204 to receiver 202.

Additional measuring optical fibers and partial reflectors can be added after partial reflector 208 to provide multiple measurement paths.

After reaching receiver 202 (which represents the entire receiving, determining and calculating electronics for either the first embodiment of FIG. 1 or the second embodiment of FIG. 4), the optical signals are converted to electrical signals and processed as described above with respect to the first and second embodiments, respectively. Although FIG. 6 shows the light signals travelling along the reference optical fiber first and then being transmitted through the first partial reflector to a measurement optical fiber, the alternative embodiment could be implemented such that the first optical fiber is a measurement optical fiber, and the second (or third or fourth, etc.) optical fiber is the reference optical fiber.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An apparatus for measuring strain in a structure comprising:
   (a) an optical source connected to a first end of a first connecting optical fiber;
   (b) means for modulating the optical source such that it emits source optical signals at a first frequency;
   (c) a first beam splitter having one input end, at least one measurement output end, and one reference output end, wherein a second end of the first optical fiber is connected to the input end of the first beam splitter, such that the source optical signals are split into at least one measurement optical signal and a reference optical signal;
   (d) at least one measurement optical fiber, wherein a first end of each measurement optical fiber is connected to one of the output ends of the first beam splitter, such that the at least one measurement optical signal propagates within the at least one measurement optical fiber;
   (e) a reference optical fiber, wherein a first end of the reference optical fiber is connected to a reference output end of the first beam splitter, such that the reference optical signal propagates within the reference optical fiber;
   (f) a second beam splitter having one output end, at least one measurement input end, and one input reference end, wherein a second end of each measurement optical fiber is connected to one of the measurement input ends of the second beam splitter, and a second end of the reference optical fiber is connected to the input reference end of the second beam splitter, such that the at least one measurement optical signal and the reference optical signal propagate out of the output end of the second beam splitter;
   (g) a time-expansion multiplier having one output end and two input ends;
   (h) a second connecting optical fiber connecting the output end of the second beam splitter to a means for converting optical signals into electric signals;
   (i) means for generating electric signals at a second frequency electrically connected to one of the two input ends of the time-expansion multiplier, wherein the means for converting optical signals to electric signals is connected to the other input end of the time-expansion multiplier;
   (j) filter means for eliminating any high-frequency components from signals output at the output end of the time-expansion multiplier, said filter means having an input end and an output end, with the input end of the filter means being electrically connected to the output end of the time-expansion multiplier;
   (k) signal detector means, having one input end and one output end, said output end being connected to the filter means, for detecting the arrival time of electrical signals received from the filter means;
   (l) timer means for measuring the time interval between the arrival of electrical signals at the signal detector means; and
   (m) means for calculating the difference in distance between the optical path travelled within the measurement optical fibers and the optical path travelled within the reference optical fibers.

2. The apparatus of claim 1, further comprising means for attaching the at least one measurement optical fiber to a structure, such that as the length of a portion of the structure changes, the length of a portion of the at least one measurement optical fiber changes correspondingly.

3. The apparatus of claim 1, wherein the first beam splitter has a plurality of measurement output ends, and the at least one measurement optical fiber is a plurality of measurement optical fibers.

4. The apparatus of claim 1, wherein the source optical signals are optical pulses.

5. The apparatus of claim 1, wherein the first frequency is selected from about 5 MHz to about 50 MHz.

6. An apparatus for measuring distances with respect to a reference distance comprising:
   (a) means for electrically generating sinusoidal signals at a plurality P of different frequencies;
   (b) means for generating a plurality of optical signals corresponding to said plurality of electrically-generated sinusoidal signals;
   (c) means for splitting the plurality of optical signals into measurement signals and reference signals and for directing the measurement signals into a plurality of measurement optical fibers and the reference optical signals into a reference optical fiber;
   (d) means for directing the measurement optical signals and the reference optical signals to a receiver means for converting the measurement optical signals and the reference optical signals into measurement electric signals and reference electric signals;
   (e) measuring means for measuring the phase shift of the measurement electric signals and the reference electric signals with respect to a signal derived from the means for electrically generating sinusoidal signals; and
   (f) calculating means for calculating the time delay of the measurement electric signals and the reference electric signals from the phase shifts measured by the measuring means.

7. The apparatus of claim 6, wherein the calculating means comprises means for solving P equations having P unknown time delays.

8. The apparatus of claim 6, wherein the plurality of signals at different frequencies comprises a series of frequencies ranging from about 10.0 MHz to about 50.0 MHz in steps of about 5 MHz.

9. The apparatus of claim 6, wherein the means for generating a plurality of optical signals comprises a light-emitting diode.

10. The apparatus of claim 6, wherein the phase shifts are measured using a heterodyne phase-measurement technique.

11. An apparatus for measuring strain in a structure comprising:
   (a) an optical source connected to a first end of a first connecting optical fiber;
   (b) means for modulating the optical source such that it emits source optical signals at a first frequency;
   (c) a first beam splitter having one input end, at least one measurement output end, and one reference output end, wherein a second end of the first optical fiber is connected to the input end of the first beam splitter, such that the source optical signals are split into at least one measurement optical signal and a reference signal;
   (d) at least one measurement optical fiber, wherein a first end of each measurement optical fiber is connected to one of the output ends of the first beam splitter, such that the at least one measurement optical signal propagates within the at least one measurement optical fiber;
   (e) a reference optical fiber, wherein a first end of the reference optical fiber is connected to a reference output end of the first beam splitter, such that the reference optical signal propagates within the reference optical fiber;
   (f) a second beam splitter having one output end, at least one measurement input end, and one input reference end, wherein a second end of each measurement optical fiber is connected to one of the measurement input ends of the second beam splitter, and a second end of the reference optical fiber is connected to the input reference end of the second beam splitter, such that the at least one measurement optical signal and the reference optical signal propagate out of the output end of the second beam splitter;
   (g) a second optical fiber connecting the output end of the second beam splitter to a means for converting optical signals to electrical signals, said means converting the at least one measurement optical signal to a measurement electrical signal and the reference optical signal to a reference electrical signal;
   (h) determining means for determining the time delay of the at least one measurement electrical signal with respect to the reference electrical signal electrically connected to the means for converting optical signals to electrical signals, said determining means comprising:
      (1) a time-expansion multiplier having one output end and two input ends, and
      (2) a means for generating electric signals at a second frequency; and
   (i) means for calculating the difference in distance between the optical path travelled by the at least one measurement optical signal and the optical path travelled by the reference optical signal.

12. The apparatus of claim 11, further comprising a filter having an input end, said filter being electrically connected at its input end to the output end of the time-expansion multiplier, said filter eliminating any high-frequency components from the signals output at the output end of the time-expansion multiplier.

13. An apparatus for measuring distances with respect to a reference distance, comprising:
   (a) means for generating optical signals at a first frequency;
   (b) means for splitting the optical signals into measurement signals and reference signals and for directing the measurement signals into a measurement optical fiber and the reference optical signals into a reference optical fiber;
   (c) means for directing the measurement optical signals and the reference optical signals to a receiver means for converting the measurement optical signals and the reference optical signals into measurement electric signals and reference electric signals;
   (d) difference determining means electrically connected to the receiver means for determining the difference between the time delay of the measurement optical signals and the reference signal, said difference determining means comprising:
      a time-expansion multiplier having a first input, a second input and one output, wherein said time-expansion multiplier is electrically connected at the first input to the receiver means, and is electrically connected at the second input to a means for generating electric signals at a second frequency; and
   (e) calculating means connected to the difference determining means for measuring the length of the measurement optical path with respect to the length of the reference optical path.

14. The apparatus of claim 13, further comprising filter means connected to the output end of said time-expansion multiplier for eliminating any high-frequency components from the signals output by the time-expansion multiplier.

15. A method for measuring strain in a structure, comprising the steps of:
   (a) generating optical signals characterized by a first frequency and inputting the optical signals into a first end of a first connecting optical fiber;
   (b) splitting the optical signals into at least one measurement optical signal and a reference optical signal, such that a measurement optical signal propagates within the at least one measurement optical fiber and a reference optical signal propagates within the reference optical fiber;
   (c) combining the at least one measurement optical signal and the reference optical signal in a second beam splitter;
   (d) converting the at least one measurement optical signal into at least one measurement electrical signal and converting the reference optical signal into a reference electrical signal;
   (e) determining the time delay of the at least one measurement electrical signal with respect to the reference electrical signal, said determining step comprising the steps of:
      (1) time-expanding the at least one measurement electrical signal and the reference electrical signal using a time-expansion multiplier having two inputs, by inputting said measurement electrical signals and said reference electrical signal to a first input of the time-expansion multiplier,
      (2) generating electric signals at a second frequency, and
      (3) inputting said electric signals at the second frequency to a second input of the time-expansion multiplier; and
   (f) calculating the difference in distance between the optical path travelled by the at least one measurement optical signal and the optical path travelled by the reference optical signal.

16. The method of claim 15, further comprising filtering the time-expanded signals to eliminate any high-frequency components from the signals output by the time-expansion multiplier.

17. An apparatus for measuring strain in a structure, comprising:

(a) an optical source connected to a first end of a first connecting optical fiber;

(b) means for modulating the optical source such that it emits source optical signals;

(c) a first beam splitter having one input end, at least one measurement output end, and one reference output end, wherein a second end of the first optical fiber is connected to the input end of the first beam splitter, such that the source optical signals are split into at least one measurement optical signal and a reference signal;

(d) at least one measurement optical fiber, wherein a first end of each measurement optical fiber is connected to one of the output ends of the first beam splitter, such that the at least one measurement optical signal propagates within the at least one measurement optical fiber;

(e) a reference optical fiber, wherein a first end of the reference optical fiber is connected to a reference output end of the first beam splitter, such that the reference optical signal propagates within the reference optical fiber;

(f) a second beam splitter having one output end, at least one measurement input end, and one input reference end, wherein a second end of each measurement optical fiber is connected to one of the measurement input ends of the second beam splitter, and a second end of the reference optical fiber is connected to the input reference end of the second beam splitter, such that the at least one measurement optical signal and the reference optical signal propagate out of the output end of the second beam splitter;

(g) a second optical fiber connecting the output end of the second beam splitter to a means for converting optical signals to electrical signals, said means converting the at least one measurement optical signal to a measurement electrical signal and the reference optical signal to a reference electrical signal;

(h) means for determining the time delay, of the at least one measurement electrical signal with respect to the reference electrical signal, electrically connected to the means for converting optical signals to electrical signals;

(i) means for calculating the difference in distance between the optical path travelled by the at least one measurement optical signal and the optical path travelled by the reference optical signal corresponding to said time delay; and wherein the means for modulating the optical source modulates the optical source at a series of P modulation frequencies, and wherein the means for determining the time delay of the at least one measurement electrical signal with respect to the reference electrical signal comprises a means for measuring the phase shift at each of the P modulation frequencies with respect to a signal derived for the means for modulating the optical source.

18. The apparatus of claim 17, wherein the means for calculating the difference in distance between the optical path travelled by the at least one measurement optical signal and the optical path travelled by the reference optical signal comprises means for solving P equations having P unknown time delays.

19. An apparatus for measuring distances with respect to a reference distance, comprising:

(a) means for generating optical signals;

(b) means for splitting the optical signals into measurement signals and reference signals and for directing the measurement signals into a measurement optical fiber and the reference optical signals into a reference optical fiber;

(c) means for directing the measurement optical signals and the reference optical signals to a receiver means for converting the measurement optical signals and the reference optical signals into measurement electric signals and reference electric signals;

(d) difference determining means electrically connected to the receiver means for determining the difference between the time delay of the measurement optical signals and the reference signals;

(e) calculating means connected to the difference determining means for measuring the length of the measurement optical path with respect to the length of the reference optical path corresponding to said time delay determined by said difference determining means; and wherein the means for generating optical signals generates optical signals at a series of P frequencies, and wherein the means for determining the time delays comprises a means for measuring the phase shift at each of the P frequencies with respect to a signal derived from the means for generating the optical signals.

20. The apparatus of claim 19, wherein the calculating means comprises means for solving P equations having P unknown time delays.

21. A method for measuring strain in a structure, comprising:

(a) generating optical signals and inputting the optical signals into a first end of a first connecting optical fiber;

(b) splitting the optical signals into at least one measurement optical signal and a reference optical signal, such that a measurement optical signal propagates within the at least one measurement optical fiber and a reference optical signal propagates within the reference optical fiber;

(c) combining the at least one measurement optical signal and the reference optical signal in a second beam splitter;

(d) converting the at least one measurement optical signal into at least one measurement electrical signal and converting the reference optical signal into a reference electrical signal;

(e) determining the time delay of the at least one measurement electrical signal with respect to the reference electrical signal;

(f) calculating the difference in distance between the optical path travelled by the at least one measurement optical signal and the optical path travelled by the reference optical signal corresponding to said time delay determined in step (e); and (g) generating optical signals at a series of P frequencies in step (a), wherein step (f) comprises measuring the phase shift at each of the P modulation frequencies with respect to signals derived from the optical source.

22. The method of claim 21, wherein step (f) comprises solving P equations having P unknown time delays.

23. An apparatus for measuring strain in a structure, comprising:

an optical source to generate an optical signal;

a first beam splitter optically coupled to said optical source for splitting said optical signal into an optical reference signal and at least one optical measurement signal;

a second beam splitter optically coupled to said first beam splitter, wherein the optical coupling is such that the optical reference signal passes through an optical reference path, and the at least one optical measuring signal travels through at least one optical measuring path, said second beam splitter configured to combine the optical reference signal and the at least one optical measurement signal into a composite optical signal;

a receiver optically coupled to said second beam splitter to detect said composite optical signal and convert it to a composite electrical signal representative of the composite optical signal;

a length calculation unit, electrically connected to said receiver for calculating the difference in the length of the paths traveled by the reference optical signal and the at least one measurement optical signal by analyzing the composite electrical signal; and wherein said optical source generates said optical signal at a first frequency, and wherein said length calculation unit comprises:
- an electrical signal source to generate an electrical expansion signal having a second frequency; and
- a time-expansion multiplier to multiply said composite electrical signal by said electrical expansion signal to thereby time-expand said electrical composite signal; and
- a length calculator to calculate the length difference of the paths traveled by the optical reference signal and the at least one optical measurement signal using the time-expanded electrical composite signal.

24. An apparatus for measuring strain in a structure, comprising:

an optical source to generate an optical signal;

a first beam splitter optically coupled to said optical source for splitting said optical signal into an optical reference signal and at least one optical measurement signal;

a second beam splitter optically coupled to said first beam splitter, wherein the optical coupling is such that the optical reference signal passes through an optical reference path, and the at least one optical measuring signal travels through at least one optical measuring path, said second beam splitter configured to combine the optical reference signal and the at least one optical measurement signal into a composite optical signal;

a receiver optically coupled to said second beam splitter to detect said composite optical signal and convert it to a composite electrical signal representative of the composite optical signal;

a length calculation unit, electrically connected to said receiver for calculating the difference in the length of the paths traveled by the reference optical signal and the at least one measurement optical signal by analyzing the composite electrical signal; and wherein said optical source comprises
- means for producing P optical signals, wherein each of the P optical signals has a distinct one of P frequencies, such that one of said P frequencies corresponds to said optical reference path, and P minus one of said P frequencies correspond to a respective one of the at least one optical measurement paths, and wherein said length calculation unit comprises:
    - a phase shift detector to detect a phase shift between the one of said P frequencies and each of said P minus one of said P frequencies, wherein said phase shift indicates a difference in the path length traveled by the reference optical signal and the at least one optical measurement signal.

* * * * *